United States Patent

[11] 3,560,655

[72] Inventors Pierre M. Lucas
20, rue Tariel, Issy-les-Moulineaux;
Jean F. Duquesne, 120, rue de Javel, Paris;
Charles E. Abraham, 114 Elysees II, La
Celle Saint Cloud, France

[21] Appl. No. 771,108
[22] Filed Oct. 28, 1968
[45] Patented Feb. 2, 1971
[32] Priority Oct. 27, 1967
[33] France
[31] 126,266

[54] TELEPHONE SERVICE REQUEST SCAN AND DIAL PULSE SCAN DEVICE
3 Claims, 4 Drawing Figs.

[52] U.S. Cl. .......... 179/18, 179/18(ES)
[51] Int. Cl. .......... H04m 3/22, H04q 3/54
[50] Field of Search .......... 179/18.9, 18SP, 18.6A, 18Reg.(Cursory), 18.7YA(Cursory), 18.6

[56] References Cited
UNITED STATES PATENTS 3,202,767 8/1965 Warman .......... 179/18(.6A)
3,420,957 1/1969 Ulrich .......... 179/18(SP)

*Primary Examiner*—Kathleen H. Claffy
*Assistant Examiner*—Thomas W. Brown
*Attorney*—Abraham A. Saffitz

ABSTRACT: Scanning circuit arrangement for scanning test terminals respectively connected to subscriber's lines and disposed along rows and columns in a matrix, the purpose of which is to detect by means of a unique scanning the service requests and the dial pulses. The terminals are scanned in groups defined by a group address and forming group test words, at a first rate, and the groups are divided into subgroups defined by a subgroup address and forming subgroup test words, at a second rate multiple of the first rate. The subgroup test words are stored in the registers of a test multiregister and the actual and previous subgroup test words are compared in a comparator which detects the rank or address of the bits in the subgroup test word which have undergone a change. The address of the test terminal including the group address, the subgroup address and the bit address are applied to a second multiregister which comprises a plurality of originating registers and a table of correspondence between the test terminal addresses and the originating register addresses. From the test terminal address, the second multiregister derives the originating register address and the change of the test terminal is written in this originating register.

Figure 1:
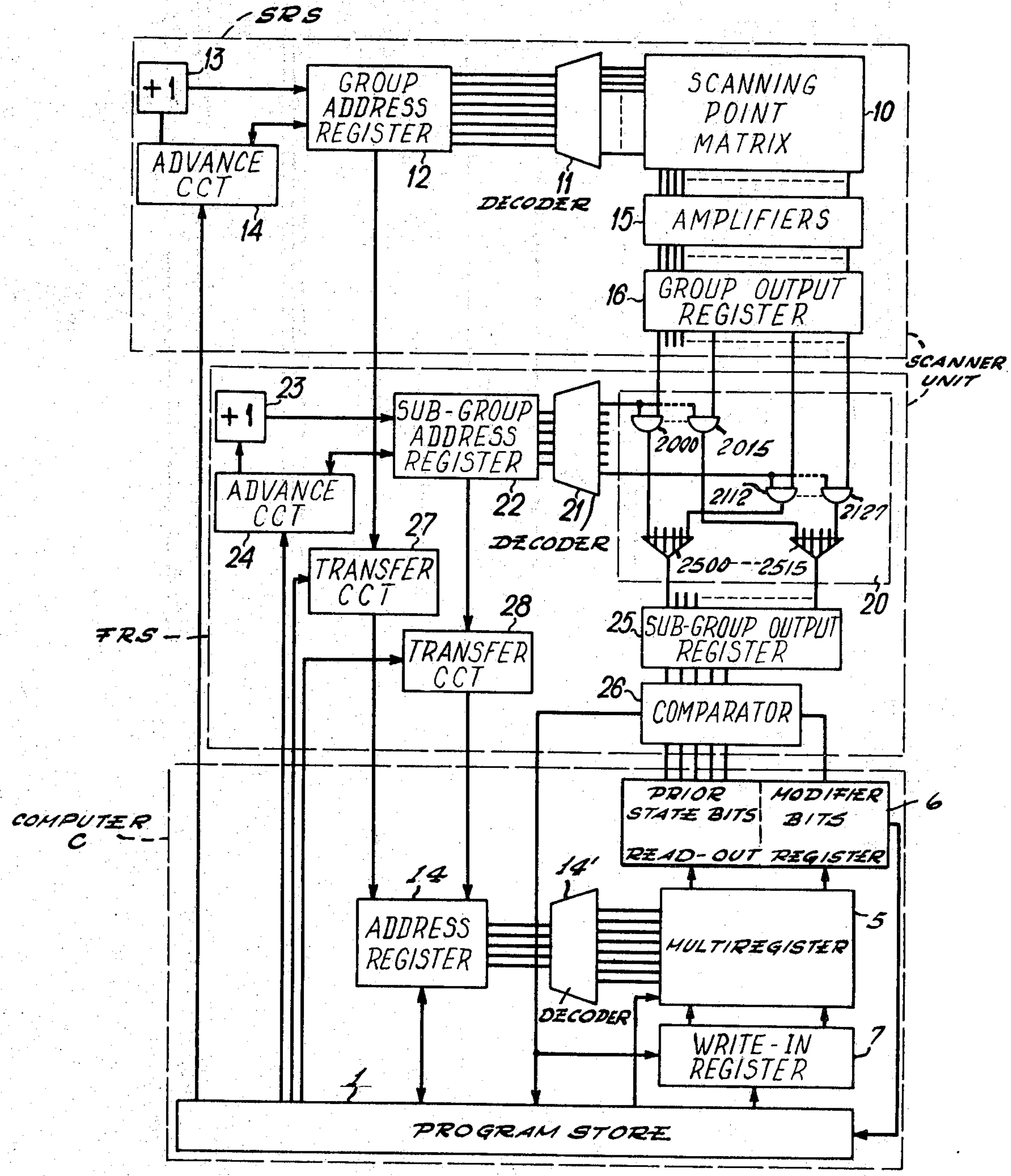
Figure 1:
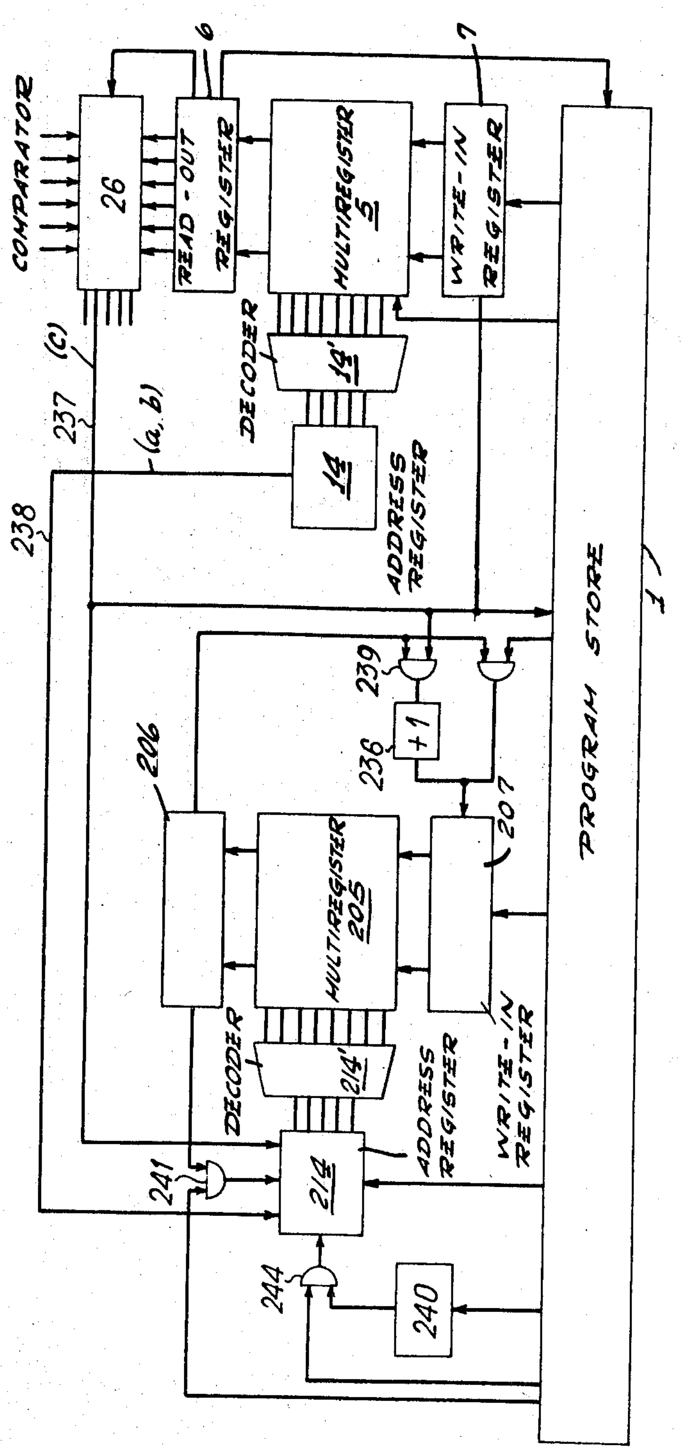

INVENTORS:
Pierre M. LUCAS,
Jean F. DUQUESNE,
and Charles E. ABRAHAM

By Abraham A. Saffitz
ATTORNEY

INVENTORS:
Pierre M. LUCAS,
Jean F. DUQUESNE,
and Charles E. ABRAHAM
By Abraham A. Saffitz
ATTORNEY INVENTORS:
Pierre M. LUCAS,
Jean F. DUQUESNE,
and Charles E. ABRAHAM
By Abraham A. Saffitz
ATTORNEY INVENTORS:
Pierre M. LUCAS,
Jean F. DUQUESNE,
and Charles E. ABRAHAM
By Abraham A. Saffitz
ATTORNEY

TELEPHONE SERVICE REQUEST SCAN AND DIAL PULSE SCAN DEVICE

The present invention relates to the scanning function of a telephone switching network with electronic central control, and more especially the case of a large exchange wherein the scanner unit, being of large capacity, cannot be as fast as the control logic.

It is known that in the electronic switching systems, the purpose of the scanning function is to detect, on a great number of lines and circuits, both long duration condition signals, such as a service call or the reply of the called subscriber in which scanning periods of the order of 1 second are admissible, and short duration condition signals such as dialing pulses which require a scanning period of 10 to 20 milliseconds. To improve the extremely low proportion of significant tests relative to the total number of tests, generally the frequency of successive tests of a given circuit or line is adapted to the type of signals which it conveys. In prior art scanning circuit arrangements, a plurality of test points arranged in a matrix each receives a marking signal from an associated line or circuit when the latter is operated to a condition for which the scanning circuit arrangement is required to detect and identify it. The test points are scanned serially, e.g. on a per line basis either cyclically "in the order of the lines" when scanning serves to detect service requests, or acyclically when scanning serves to detect signals conveyed by already supervised lines. In the latter case, scanning is performed "in the order of the originating registers assigned to the lines."

As a consequence of developments in computer technology, when it is desired to construct large-capacity switching networks requiring scanner units of great dimensions, limits are generally set not by the speed of the logic and of the stores of the computer, but mainly by the operating time of the scanner units.

One object of the present invention is to obtain a substantial increase in the traffic capacity of a switching network with space or time-division in the case where this capacity is limited by the operating time of the scanner unit.

It is known in the art to scan lines in groups for service requests. The test points associated with the lines are arranged in lines and columns of a matrix and the potentials of the text points of a line form a word, each bit of which represents the state of a respective line. The word actually scanned is then compared with the scan word derived during the previous cycle. A change in any bit value indicates a request for service or a signal, for example a dial pulse, on the line, that is a further processing for the line concerned. The particular lines requiring this further processing are determined by the positions in the scan word of the bits whose values have changed.

In these prior art scanning devices, the service request scan and the dial pulse scan are separated since, while the service request scan requires the line identities which are written in the originating registers, the dial pulse scan disregards the line identities. The service request scan is made by a line scanner and the dial pulse scan is made by a junctor scanner.

In the present invention, the scan of the lines and circuits is made by a unique scanner unit, first per groups of lines forming a word and second per subgroups of lines forming subwords. The old and new subwords are compared in a comparator which detects the rank of the bits of the subwords which have undergone a change. A first multiregister is designed for updating the subwords in first registers having a composite address comprising a line group address and a line subgroup address. Then the originating register dealing with the communication message concerned is searched to be updated. For this, a second multiregister connected with the originating registers is provided and first the register word sorted in the originating register having the composite address completed by the address is read out, the said register word containing the address of the originating register dealing with the communication concerned, and secondly, this originating register is searched and updated.

The invention will now be described with reference to the accompanying drawings, which illustrate the invention but in no restrictive sense.

Figure 2:
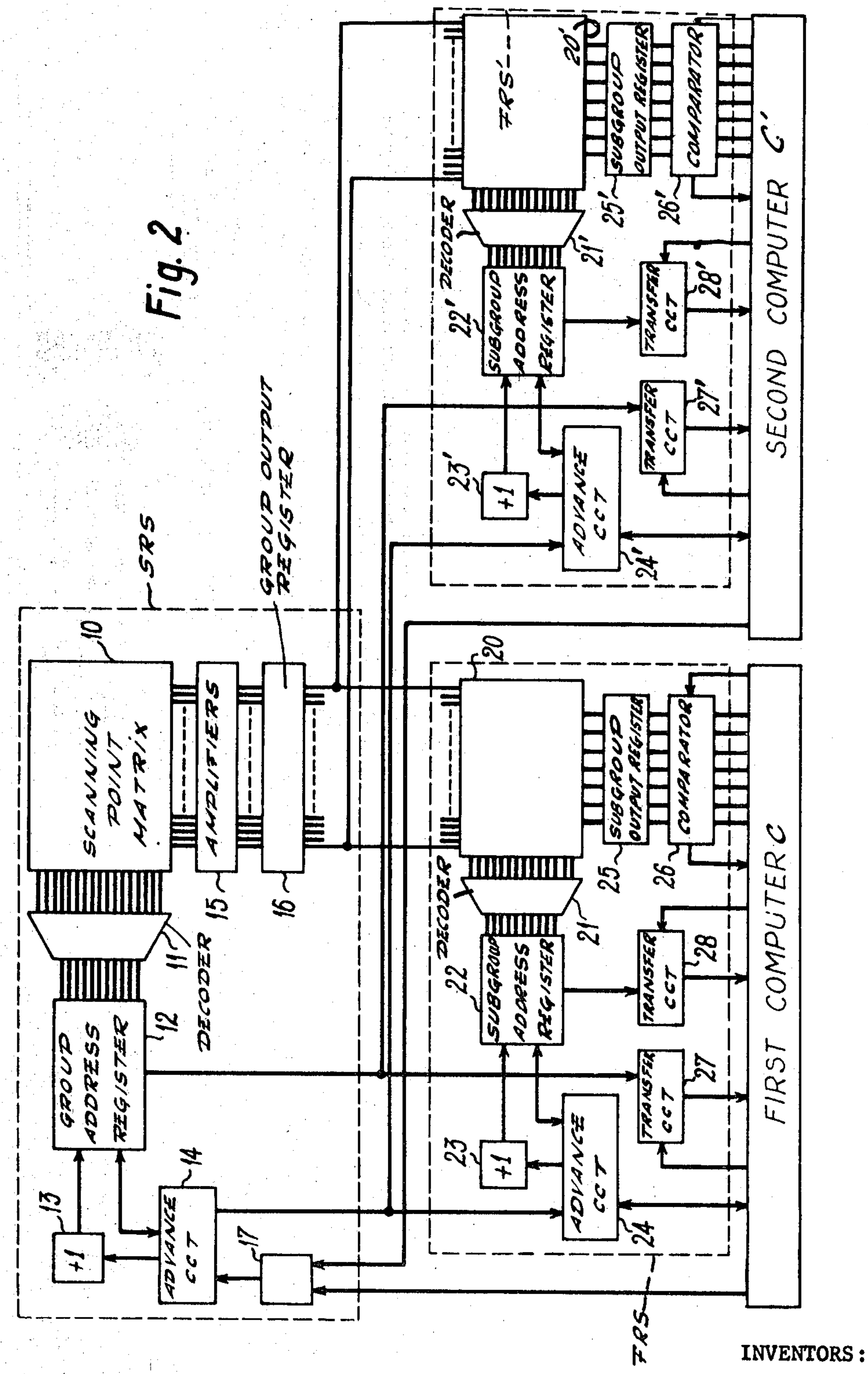
Figure 3:
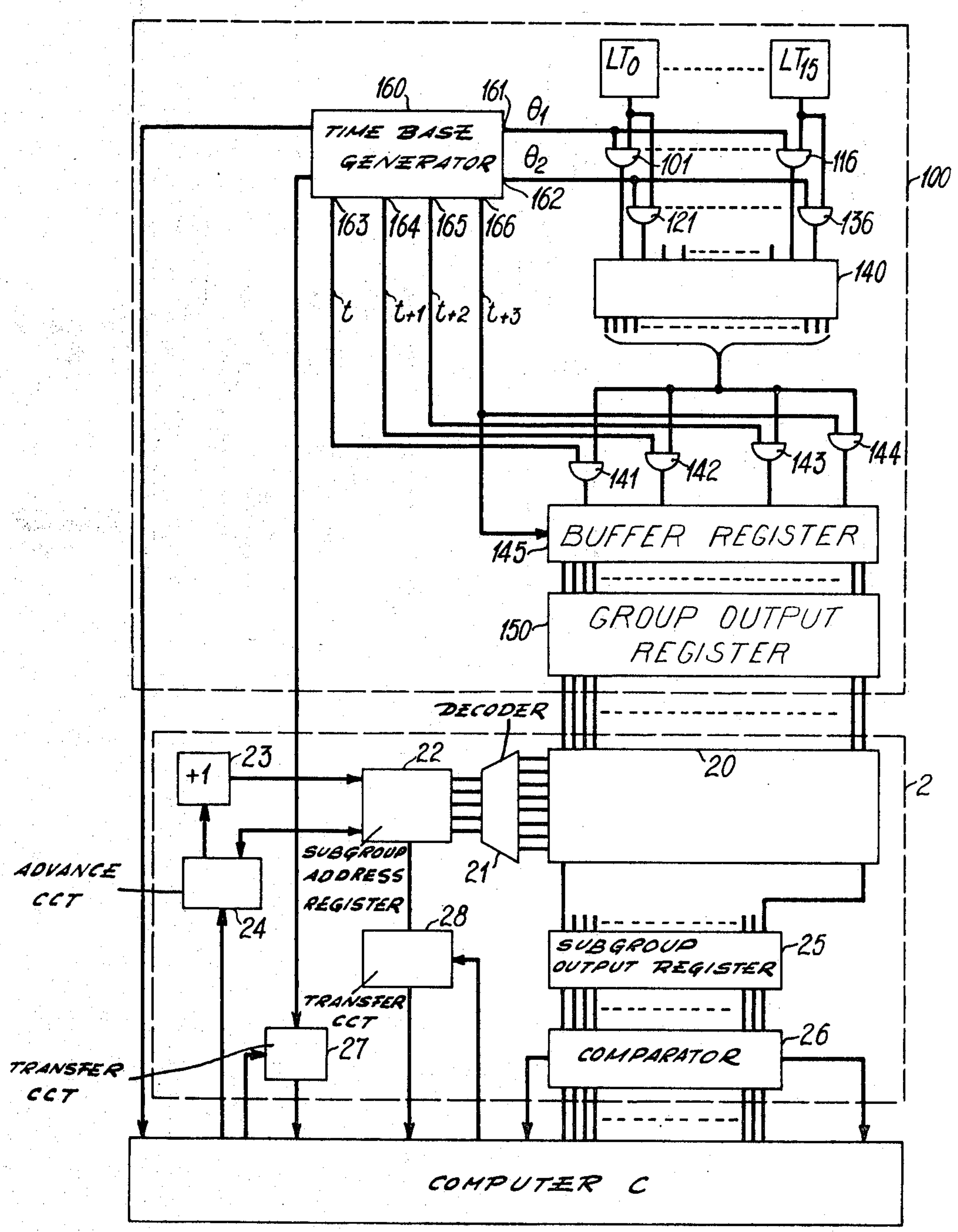

FIGS. 1 and 1' show a block circuit diagram of a cyclic scanner unit according to the invention for a space-division switching network;

FIG. 2 is a diagram showing a cyclic scanner unit according to the invention for a space-division switching network having two control computers; and FIG. 3 is a block circuit diagram of a cyclic scanner unit according to the invention for a time-division switching network.

As FIG 1 shows, the cyclic scanner unit consists of a slow-rate scanner SRS, a fast-rate scanner FRS and an electronic computer C which may for example be of the type described in U. S. Pat. No. 3,497,630 of P. M. Lucas et al. issued Feb. 24, 1970.

The slow-rate scanner SRS comprises a matrix of scanning points 10, each of said points being connected to a line or circuit to be scanned. The scanning matrix is controlled, through a decoder, 11, by a group address register 12, normally progressing in a sequential manner thanks to an adding circuit 13 controlled by an advance circuit 14, and it includes a set of reading amplifiers 15 linking each column of matrix 10 with a binary stage of a group output register 16.

The fast-rate scanner FRS comprises a group of sampling gates 20 controlled, through a decoder 21, by a subgroup address register 22 normally stepped sequentially thanks to an adding circuit 23 controlled by an advance circuit 24. The number of AND gates in the set of gates 20 equals the number of binary stages in the group output register 16, i.e. as many as there are columns in the matrix 10, and there are as many OR gates as there are inputs in the subgroup output register 25, each OR gate having as many inputs as there are outputs on the decoder 21. Each output of the decoder 21 controls in parallel a subgroup of AND gates and the outputs of corresponding rank of each subgroup are connected to the inputs of a given OR gate.

Assuming for example that the scanning point matrix 10 comprises 128 columns and 64 rows, the group address decoder 11 comprises 64 outputs and the groups output register 16 comprises 128 binary stages. If such a group is divided into eight subgroups, each of the eight outputs of decoder 21 controls a subgroups of 16 AND gates 2000 to 2015...2112 to 2127, and the outputs of the gates of the same rank 2000 to 2112...2015 to 2127 of each of the eight subgroups are connected to the 8 inputs of the 16 OR gates 2500—2515. The outputs of the 16 gates 2500—2515 are connected to the 16 inputs of a subgroup output register 25, the outputs of which are connected to a set of corresponding inputs of a comparator 26 itself connected to the computer C as will be seen later. Moreover, transfer circuits 27 and 28, controlled by the computer C, respectively link with the latter the group address register 12 and the subgroup-address register 22.

In block C there is shown a program permanent store 1, a multigregister 5, a readout register 6, a write-in register 7 and an address register 14 associated with a decoder 14'. The parts 1, 5, 6, 7 and 14 are given the same reference numerals as in U.S. Pat. No. 3,497,630 above referred to. Other circuits associated with program permanent store 1, such as a readout register and a function decoder, are not explicitly represented and as regards the present invention are assumed to be included in block 1. The detailed arrangement is fully represented in the above cited patent. Address register 14 is connected to each of the transfer circuits 27 and 28 which can respectively transmit thereto, on instructions from program store 1, the addresses of group *a* and subgroup *b* of registers 12 and 22. The set of these two addresses designates a word of multiregister 5, comprising for example 32 bits. The first 16 bits represent the previous states of the 16 scanned points constituting the subgroup whose address *b* has been designated by the register 22 in the group whose address *a* was designated by the register 12, while the 16 other bits are modifier or masking bits, the meaning and use of which shall be explained in the following. On receipt of a store activating instruction coming from program store 1, the word written in the designated register of the multiregister is transferred into the read-out register 6. The first 16 outputs of the latter are connected to a second set of inputs of comparator 26 symmetrical with the first, while the other 16 outputs of read out register 6 are connected to a third set of inputs of comparator 26 and to the program store 1. Comparator 26 is also connected to write-in register 7 and to program store 1. The latter further controls directly register 7 for functions not related to the scanning and also controls the group address advance circuit 14 and the subgroups address advance circuit 24.

The mode of functioning of the device shown in FIG. 1 is as follows:

A group-cycle starting pulse being applied by the program store 1 to the group address advance circuit 14, the latter shifts by one unit the address *a* of group address register 12 by means of circuit 13 and controls the reading out of the corresponding row of matrix 10. The row of address *a* having been interrogated, the simultaneous answers of the 128 points tested appear in the group output register 16.

As soon as the information has been stabilized therein, the program store 1 transmits to the advance circuit 24 a pulse which shifts the subgroup address *b* by one unit in register 22. The program store then causes the new group address to be transferred from register 12 and the new subgroup address to be transferred from register 22 to the address register 14 of multiregister 5 by applying unblocking signals to transfer circuit 27 and transfer circuit 28. As a result of these unblocking signals, the addresses *a* of the group and *b* of the subgroup are identical in registers 12 and 22 of the scanner unit and in the address register 14 of multiregister 5.

The program store 1 then initiates the reading of the word of multiregister 5 whose address *ab* is located in the address register 14, which tranfers the prior state bits and the modifier bits of the word of address *ab* into the read out register 6. The comparator 26 compares the 16 bits of the subgroup output register 25, representing the present states of the 16 lines of subgroups *ab*, with the 16 bits of read out register 6 which represent their previous states and, taking into account the value of the modifier bits associated with each of them, feeds to the register 7 the 16 bits to be reinscribed into multiregister 5, and possibly also a sequence interrupting signal to program store 1. If there is no divergence between the contents of register 25 and the "prior state" section of register 6, or when a difference appears between two of these bits of a given rank, and simultaneously the modifier bit of the same rank indicates that this divergence must be ignored, the program store 1 merely transmits to the advance circuit 24 an advance pulse to pass to the next subgroup *b* and the word of address *ab'* is processed as previously the word of address *ab*. In the contrary case, the program store 1 initiates a special sequence of its program to deal with the detected event.

A significant line condition change is characterized by:

- a change between the prior state and the actual state of the scanning point being processed;
- the fact that the change inhibit circuit is not operating that is, the modifier bit is a 0 and not a 1. The change inhibit circuit allows the changes in lines already supervised by other computers to be disregarded.

Changes in the state of the scanning points concern two cases:

- the line is in the calling condition and a register is to be alloted thereto;
- the line is already supervised by a register already alloted.

Referring now to FIG. 1', circuits 205, 206, 207, 214 and 214' are respectively similar to circuits 5, 6, 7, 14 and 14' but while the words of multiregister 5 concerns the state of subgroups of scanning points, the words of multiregister 205 concern a given scanning point. The contents of the words of multiregister 205 are detailed in U.S. Pat. No. 3,497,630 referred to above. Each word particularly contains the number of the register which supervises the scanning point of a given address *abc*.

When a change is detected, the number *c* of the scanning point in the subgroup given by comparator 26, together with the group number *a* and the subgroup number *b* stored in address register 14, are transferred respectively through leads 237 and 238 to address register 214 and the word of address *abc* is read out from multiregister 205 and stored in readout register 206. The part of this word which contains the address of that of the registers of multiregister 205 which supervise the communication through the line whose scanning point is point *abc* is transferred into address register 214 through gates 241 and the register word of that address is readout in register 206. It is then transferred to write-in register 207 through gates 239 and +1 adder 236. Then the register word is rewritten with proper modification in multiregister 205 (it is explained in U.S. Pat. No. 3,497,630 that the number of scanning cycles of a given point in the scanning point matrix is written in the multiregister).

At the same time the parallel scanning word is transferred from comparator 26 to write-in register 7.

Computers are known from the U.S. Patent above referred to, which, each time a register is seized by a calling line, designate the number of the following register to be seized at the next call. This number is assumed to be stored in register 240. When there is no register number in the word of address *abc* in multiregister 205, the register address stored in register 240 is transferred to address register 214 and the process continues as when the register number comes from multiregister 205.

FIG. 2 shows the adaption of a scanner unit of the type shown in FIG. 1 to the control by two computers C and C'. As FIG. 2 shows, with each of these there is associated two fast-rate scanner FRS and FRS', identical with that of FIG. 1, which are connected in parallel to the outputs of the advance circuit 14 and of the group output register 16 of a low-rate scanner LRS. The only difference relative to FIG. 1 is that the control input of the advance circuit 14 is connected to the two computer C, C' through a circuit 17 which transmits an advance pulse to the advance circuit when each of the two computers has supplied a pulse indicating that it has finished the series of subgroup cycles relative to the content of group output register 16.

As soon as a new information has been stabilized in this register, it is independently analyzed by the two computers C and C' which each drives its own subgroup advance circuit 24, 24' according to its own rhythm and it in accordance with the operations completed. In general, the two computer do not deal with the same scanning points, the modifiers being different, so that the data processing which they carry out on the result of the test of the scanning point group actually tested are also different. However, the updating of their multiregister as regards the part concerning the previous condition obviously leads to the same result, namely to copy thereinto the content of output register 16.

If it is assumed for example that the response time of the slow-rate scanner SRS of the scanner unit is of the order of 5 microseconds and that functioning of the latter in cyclic mode gives in parallel, in each group cycle of 5 microseconds, the result of the test of 128 scanning points, the analysis of this result by the computer C necessitates the execution by the computer and by the fast-rate scanner FRS (FIG. 1) or by the fast-rate scanners FRS and FRS' (FIG. 2) of eight subgroup cycles each relating to one-eighth of the group tested, i.e., comprising 16 bits and each having a mean duration less than or equal to 625 nanoseconds, which can be easily realized with the logical circuits and stores currently available. The number of registers of a multiregister being generally of the order of one-twentieth of the subscriber lines served, it is seen that the cyclic scanner unit according to the invention which gives with each test the results of the test of 128 points in parallel, without distinction between "supervised" and "unsupervised" points, can, in principle, have a capacity six times greater than that of an acyclic explorer operating with the same speed and testing only supervised points. The cyclic exploration being carried out according to the sequence of the lines, it requires only, relative to acyclic exploration which is carried out according to the sequence of the registers, the updating by the computer, in a high-speed store multiregister 205), of a table of assignment of the registers to the supervised lines, making it possible to identify the register assigned to a given line.

FIG. 3 shows the adaptation of a scanner unit according to FIG. 1 to a time-division switching network which is controlled by a stared program computer. It is assumed that each modern unit serves 512 subscribers, of which it can multiplex 64 simultaneous communications on a transmit group highway and a receive group highway, each with 32 time slots. The sampling frequency is assumed to be 8 kHz. and each sampling period of 125 microseconds is thus divided in 32 time slots $t_o$ to $t_{31}$, of 3.9 microseconds, during which the test line of the modern unit transmits successively two bits indicating the condition of the loops of the two subscribers who are linked by the corresponding time slots of the two group highways.

The time-division switching network comprises 16 modern units and each of the 16 test line $LT_o$ to $LT_{15}$ associated therewith provides during the first and second half of each time slot $t_o$ to $t_{31}$ two bits $\theta_1$ and $\theta_2$ which represent respectively the conditions of the loop of the subscriber lines to which the corresponding time slots of the two group highways of the modern unit concerned are assigned.

The slow-rate scanner SRS of FIG. 1 is replaced by a circuit 100 whose task is to store, in a group output register 150, 128 bits sampled on test line $LT_0$ to $LT_{15}$ during four successive time slots.

The test lines $LT_0$ to $LT_{15}$ are respectively connected on one hand by 16 AND gates 101–116 to the 16 inputs of the first half of a register 140 having 32 binary stages, and on the other hand by 16 AND gates 121–136 to the 16 inputs of the second half of the same register 140. It results from this arrangement that during each time slot, 16 bits corresponding to the states of the 16 transmit group highways and 16 bits corresponding to the states of the 16 receive group highways are stored in register 140. The 32 outputs of register 140 are connected to the 32 inputs of the first quarter of a buffer register 145 having 128 binary stages by a set of 32 AND gates 141, to the 32 inputs of the second quarter of register 145 by a set of 32 AND gates 142 and , in the same manner, to the inputs of the third and fourth quarter of this register 145 by sets of AND gates 143, 144 each comprising 32 gates. The 128 outputs of buffer register 145 are connected to the 128 inputs of a group output register 150. A time base generator 160 supplies on two outputs 161 and 162 regularly alternating bits $\theta_1$ and $\theta_2$, having a period of one time slot, the first $\theta_1$ of which unblocks the gates 101—116 during the first half of each time slot while the second $\theta_2$ unblocks the gates 121—136 during the second half of each time slot. The time base generator 160 supplies, through four outputs 163—166, trains of four successive pulses $t_0$, $t_1$, $t_2$, $t_3$, then $t_4$, $t_5$, $t_6$, $t_7$ and so on, regularly spaced, with a periodicity of four channel time, i.e. 15.6 microseconds for each train of four pulses.

Output 163 of time base generator 160 is connected to the unblocking inputs of the 32 gates 141. The outputs 164, 165 are respectively connected to the unblocking inputs of the two sets of gates 142, 143. The output 166 is connected on one hand to the unblocking inputs of 32 gates 144, and on the other hand to an input controlling the transfer of the contents of buffer register 145 into the group output register 150.

Thus, during each group of four successive time slots, in a first half-time slot the 16 bits $\theta_1$ displayed by the test lines $LT_0$—$LT_{15}$ are registered in the first half of register 140, during the following half-time slot the 16 bits $\theta_2$ are registered in the second half of register 140. At the next time slot, the content of register 140 is transferred into the first quarter of buffer register 145 and a similar operation is repeated three times to fill the last three-quarters of register 145, the setting up of the fourth quarter of this register being followed by the transfer of all its contents into the group output register 150.

The analysis of the content of this register is effected by a fast-rate scanner FRS and a computer C identical with those of FIG. 1.

Applied to a large capacity exchange operating with time division, this mode of exploration leads to an operating rate of the same order of magnitude as in a space-division exchange. For example, in the case of an exchange with 64 modern units, i.e. more than 30,000 lines or circuits, the 128 bits are received in each time slot i.e. every 3.9 microseconds, which limits the duration of a subgroup cycle to less than half a microsecond.

We claim:

1. In a telephone switching system including a plurality of lines conveying telephone communications and a central control, a scanning circuit arrangement comprising a matrix of scanning terminals respectively connected to said lines and arranged in rows and columns, a group address register associated with said matrix and controlled by said central control at a first rate, means controlled by said group address register for sequentially scanning said matrix row by row and driving therefrom group test words defined by a group address, a comparator, means for sequentially generating subgroup test words forming parts of said group test words, a subgroup address register associated with said generating means and controlled by said central control at a second rate multiple of the first rate, said subgroup test words being defined by a subgroup address, a first multiregister comprising a plurality of test registers for storing said subgroup test words at test subgroup addresses formed by both said group address and said subgroup address, means for sequentially applying to the comparator new subgroup test words actually generated by said generating means and previous subgroup test words stored in said test registers, said new and previous subgroup test words being compared having the same test subgroup addresses, means in said comparator for detecting the addresses of the bits in said new subgroup test words which have changed, a second multiregister comprising a plurality of originating registers respectively assigned to said telephone communications, means in said second multiregister for deriving from a scanning terminal address comprising the group address, the subgroup address and the bit address, the address of the originating register assigned to the communication through the line connected to said scanning terminal, and means to enter said change in said originating register.

2. In a telephone switching system including a plurality of lines conveying telephone communications and a central control, a scanning circuit arrangement as set forth in claim 1 in which the second multiregister comprises a plurality of originating registers, a plurality of supplemental registers having addresses each including the group address, the subgroup address and the bit address of a scanning terminal, containing the address of an originating register when an originating register is already assigned to the communication through the line connected to said scanning terminal and containing no address when an originating register is to be assigned to said communication, a special register containing the address of an idle originating register to be seized and means for selectively entering the change undergone by said scanning terminal into said assigned originating register and said idle originating register.

3. In a telephone switching system including a given number of group highways conveying telephone communications in multiplexed time slots and a central control, a scanning circuit arrangement comprising a group register having a given number of binary stages, means controlled by said central control for sequentially connecting at a first rate said group register to said group highways during a selected number by the time slots, the product of the group highway number by the time slot selected number being equal to the binary stage number, the contents of said group register defining group test words and said connecting means defining group addresses, a comparator, means for sequentially generating subgroup test words forming parts of said group test words, a subgroup address register associated with said generating means and controlled by said central control at a second rate multiple of the first rate, said subgroup test words being defined by a subgroup address, a first multiregister comprising a plurality of test registers for storing said subgroup test words at test subgroup addresses formed by both said group address and said subgroup address, means for sequentially applying to the comparator new subgroup test words actually generated by said generating means and previous subgroup test words stored in said test registers, said new and previous subgroup test words being compared having the same test subgroup addresses, means in said comparator for detecting the addresses of the bits in said new subgroup test words which have changed, a second multiregister comprising a plurality or originating registers respectively assigned to said telephone communications, means in said second multiregister for deriving from a scanning terminal address comprising the group address. the subgroup address and the bit address, the address of the originating register assigned to the communication through the line connected to said scanning terminal. and means to enter said change in said originating register.